United States Patent [19]

Ney

[11] 4,401,571
[45] Aug. 30, 1983

[54] METHOD FOR REMOVING LIQUIDS FLOATING ON WATER

[76] Inventor: Karl F. Ney, Hauptstrasse 15, Wolfsthal A-2412, Austria

[21] Appl. No.: 346,040

[22] PCT Filed: Jun. 16, 1981

[86] PCT No.: PCT/AT81/00015
§ 371 Date: Jan. 25, 1982
§ 102(e) Date: Jan. 25, 1982

[87] PCT Pub. No.: WO81/03656
PCT Pub. Date: Dec. 24, 1981

[30] Foreign Application Priority Data

Jun. 16, 1980 [AT] Austria ............................ 3172/80

[51] Int. Cl.$^3$ ............................................. C02F 1/40
[52] U.S. Cl. .................................... 210/680; 210/693; 210/924
[58] Field of Search ................... 210/680, 693, 924

[56] References Cited

U.S. PATENT DOCUMENTS

| | | | |
|---|---|---|---|
| 3,676,357 | 7/1972 | Ciuti et al. | 210/680 |
| 3,816,359 | 6/1974 | Creamer | 210/693 |
| 3,819,514 | 6/1974 | Clampitt et al. | 210/693 |

FOREIGN PATENT DOCUMENTS

| | | |
|---|---|---|
| 1944679 | 3/1971 | Fed. Rep. of Germany . |
| 1523828 | 5/1968 | France . |
| 2103217 | 4/1972 | France . |
| 1170959 | 11/1969 | United Kingdom . |

*Primary Examiner*—Ivars C. Cintins
*Attorney, Agent, or Firm*—Kurt Kelman

[57] ABSTRACT

Method for removing a liquid floating on water, for example oil, particularly crude oil on sea water, with a water-resistant synthetic resin foam formed in situ in the region of the water surface to be cleaned, a mixture containing a solvent-free liquid epoxy resin, 5–15%, by weight, based on the epoxy resin, of a resin hardening agent on the basis of an alkylphenol and a biphenol as well as a methylalkyl ketone and 20–30%, by weight, of an accelerator being cured with a di- or polyamine around the liquid to be removed and, optionally, also around the center thereof.

12 Claims, No Drawings

METHOD FOR REMOVING LIQUIDS FLOATING ON WATER

The removal of organic substances floating on water, particularly crude oil on sea water, is of worldwide importance for purposes of environmental protection. Many proposals have already been made to solve this problem.

In German Pat. No. 1,953,587, it has been proposed, for example, to catch foreign bodies floating on a water surface with a flexible barrier. U.S. Pat. No. 3,607,741 describes the use of hydrophobic and oil-resistant impregnated cellulose for absorbing oil. German Pat. Nos. 2,417,431, 2,520,999 and 2,654,909 disclose the removal of oil from water by the action of oil-decomposing microbes. In German Pat. Nos. 2,802,673 and 2,806,851, it has been proposed to bind the oil with organic or inorganic powders having large surface areas. It has also become known from French Pat. No. 1,523,828 to remove organic liquids from their mixtures with water by treating them with solid, particulate adsorption media for the organic liquids. These adsorption media consist especially of crosslinked vinyl polymers, the chemical composition of the polymers and especially their degree of crosslinking determining the extent of their adsorption capacity.

According to French Pat. No. 2,103,217, a compound which polymerizes under the action of water is applied to the liquid floating on water and this compound forms a solid structure after polymerization, which envelops the organic liquid and may be removed therewith from the water. The proposed polymerizable compound is 2-cyano acrylate.

According to German Pat. No. 1,944,636, a mixture of foamed flakes of polystyrene and polyurethane or condensation polymerized resins are applied to the water surface carrying a layer of oil. The flake mixture adsorbs the oil, the polystyrene foam selectively adsorbing the high molecular oils and the polyurethane foam the lighter, volatile substances, such as gasoline, for example.

Finally, it is known from British Pat. No. 1,170,959 to prepare a synthetic resin foam in situ on or below the surface to be cleaned to adsorb the oil layer. Only polyurethane is mentioned as a useful synthetic resin for this purpose.

All of these methods have the disadvantages that, for economic reasons, they are practically not applicable on a large scale or are only insufficiently effective.

These disadvantages have been overcome by the method of this invention. The invention relates to a method for removing a liquid floating on water, for example oil, particularly crude oil on sea water, by forming a water-resistant synthetic resin foam in situ in the range of the water surface to be cleaned.

This method is characterized according to the invention by curing a mixture containing a solvent-free liquid epoxy resin, 5–15%, by weight, based on the epoxy resin, of a resin improving agent on the basis of an alkyl phenol and a biphenol as well as a methylalkyl keton, and 20–30%, by weight, based on the curing agent, of an foaming agent and an accelerator with a di- or polyamine curing agent around the liquid to be removed or, optionally, in the middle thereof.

It is preferred to use about 7%, by weight, of the resin improving agent and about 25%, by weight, of the foaming agent and accelerator. It is also advantageous to add about 10 to 100, especially 10–20%, by weight, based on the epoxy resin, of an additive to the mixture.

Ethylene diamine, diethylene triamine, dipropylene triamine or triethylene tetramine are the preferred di- or polyamines.

According to a preferred embodiment of the invention, the curing of the mixture with the di- or polyamine is effected in the presence of stoichiometric amounts of polybutadiene and/or mixed polymers of butadiene and styrene.

The foam ring formed of these components absorbs the oil. Optionally, additional foam is formed in the middle of the liquid to be removed if the foam ring formed around the liquid has not fully absorbed the entire liquid. For example, if large oil slicks are formed as a result of a tanker accident, the oil slick may first be surrounded by a foamed substance and any residual oil remaining in the middle and not bound thereby may be bound by additional foam formation in the center of the oil. The foam material soaked with oil may be taken away, for example, by ships equipped with dredgers and, if desired, the oil may be recovered by pressing.

A foam formed by the curing of the indicated mixture has the following properties: it is hydrophobic and, therefore, it may be formed in water; its density is at least 150 g/l; its pore size is adjustable; the resin volume is increased 6- to 10-fold during the foam formation.

Any epoxy resin may be used as the epoxy resin, including such resins which contain other hetero-atoms, such as, for example, nitrogen and silicon, in addition to oxygen atoms.

The epoxy resin preferably is a resin obtained by the reaction of epichlorohydrin with diphenylolpropane and preferably has an average molecular weight of 330 to 470, an epoxy equivalent weight (gram of resin containing one mol of epoxide) of 170 to 270 and an epoxy value (mol epoxide/100 g of resin = 100: epoxy equivalent weight) of 0.37 to 0.59.

The resin improving agent has the task of assuring the water resistance of the finished foam. In the resin improving agent, cresols, butyl phenol and particularly p-nonyl or dodecyl phenol are useful as alkyl phenols; biphenol A is particularly useful as biphenol but other biphenols, such as bisphenol B or o,o′-biphenol, or a mixture of bisphenols, may be used in the resin improving agent. Methylethyl or methylisobutyl ketone may be used as methylakyl ketone. For example, the resin improving agent may consist of 30 to 40%, by weight, of alkyl phenol, 25 to 35%, by weight, of biphenol and 30 to 40%, by weight, of methylalkyl ketone.

The foaming agent is a silicon polymer with Si-H-groups and the accelerator may be salicylic acid or phosphoric acid. A mixture of two or three of these three compounds may be used.

Such a mixture is produced by mixing the epoxy resin, the resin improving agent the foaming agent and the accelerator; additives may be admixed to this mixture or may be admixed to the resin improving agent or to the accelerator may the mixtureis produced. Oil-absorbing substances, such as for example asbestos dust, short asbestos fibers, wood flour or vermiculite, may be used as additives, particularly in amounts of 10–20%, by weight.

Such a mixture (M) may contain, for example:
(1) an epoxy resin having the following properties: viscosity at 25° C., 8 poise; epoxy equivalent weight: 180; epoxide value: 0.56; average molecular weight: 330.

(2) 7%, by weight, of a mixture consisting of 35%, by weight, of p-nonyl-phenol or dodecylphenol; 30%, by weight, of biphenol A of the formula $HOC_6H_4$-$C(CH)_2$-$C_6H_4OH$ and 35%, by weight, of methylethylketone or methylisobutylketone.

(3) foaming agent: 35%, by weight, of a linear polymethylhydrogen siloxane having the following properties: viscosity at 25° C.: 30 cSt; density at 25° C.: 1000; refractory index: $n^{25}{}_D = 1.396$.

The required amount of hardening agent depends, as is known, on the epoxide value of the resin and the amine used. Normally, the reaction is carried out with a small excess of amine.

According to the previously mentioned most advantageous embodiment, curing is effected in the presence of stoichiometric amounts of polybutadiene and/or mixed polymers on the basis of butadiene and styrene.

This embodiment is based on the hardening method described in Austrian Pat. No. 262,619 which enables the preparation of synthetic substances of a degree of hardness from the hardness of glass to yieldingly elastic. This is obtained by a corresponding selection of the proportions of the epoxy resin being hardened and the polybutadiene or the copolymerized butadiene-styrene, the hardness of the end product decreasing with an increase in the proportion of the polymer of copolymer added to the expoxy resin until it becomes elastic and stretchable. In this manner, rubber-elastic to steel-hard foams may be obtained according to the invention, depending on the prevalent requirements.

According to the method according to the invention, the following starting materials may be used in the indicated proportions:

| Butadiene-styrene or polybutadiene | Epoxy resin content of the mixture | Polyamine as hardener |
|---|---|---|
| (1.) 50 | 730 | 220 |
| (2.) 100 | 700 | 200 |
| (3.) 150 | 650 | 200 |
| (4.) 200 | 600 | 200 |
| (5.) 250 | 550 | 200 |

Epoxidized polymer of this type with an oxygen content of 4–12% of the mass and viscosity of maximally 300 Pa up to 20° C. are preferably used as polybutadiene or the mixed polymer on the basis of butadiene and styrene.

These proportions are always on the basis of 1000 weight units.

Compound 1.) results in a very hard end product. The hardness decreases in the series of compounds 2.), 3.), 4.), 5.), and the end product accordingly, becomes more elastic as well as more yielding and stretchable.

The adjustability of the degree of hardness of the foam to be formed makes it particularly useful for the present invention. The hardness or elasticity of the foam may be adjusted to the prevailing conditions, for instance by taking into account high waves.

The procedure according to the invention will be illustrated in the following example.

A cup having the dimensions $27 \times 34$ cm is filled with water up to a level of 5 cm and 20 cm$^3$ of crude oil is poured thereover. The crude oil forms a substantially circular area of about 11.5 cm$^2$.

About 30 g of the above-mentioned mixture M is placed into a beaker. Within the pot time of this mixture, a narrow ring of about 28 g of the mixture is poured around the oil slick. After a few minutes, the ring has foamed and has fully adsorbed the oil.

When there is more crude oil and a larger oil slick has been formed, causing a layer of non-adsorbed oil to remain in the center after formation of as narrow a ring of foam as in the above example, this may be removed by applying an additional amount of foam.

I claim:

1. A method for removing a liquid floating on a water surface by in-situ formation of a water-resistant synthetic resin foam on the water surface, comprising the step of forming the foam around the liquid to be removed by curing, with a curing agent selected from the group consisting of di- and polyamines, a mixture containing a solvent-free liquid epoxy resin, 20–30%, by weight, based on the curing agent, of a silicon polymer with Si-H-groups as a foaming agent, 5–15%, by weight, based on the epoxy resin, of a resin improving agent selected from the group consisting of an alkyl phenol, a biphenol and a methylalkyl ketone, and 20–30%, by weight, based on the curing agent, of an accelerator.

2. The method of claim 1, wherein the liquid is oil.

3. The method of claim 2, wherein the liquid is crude oil and the water is sea water.

4. The method of claim 1, wherein the foam is also formed substantially in the center of the liquid.

5. The method of claim 1, wherein the mixture contains 7% of the resin improving agent.

6. The method of claim 1, wherein the mixture contains 25% of the accelerator.

7. The method of claim 1, wherein the accelerator is selected from the group consisting of salicylic and phosphoric acid.

8. The method of claim 1, wherein the mixture additionally contains 10–100%, by weight, based on the epoxy resin, of an additive.

9. The method of claim 8, wherein the additive does not exceed 20%, by weight, based on the epoxy resin.

10. The method of claim 8, wherein the additive is asbestos dust, short asbestos fibers, wood flour or vermiculite.

11. The method of claim 1, wherein the curing agent is selected from the group consisting of ethylene diamine, diethylene triamine, dipropylene triamine and triethylene triamine.

12. The method of claim 1, wherein the mixture is cured in the presence of a stoichiometric amount of polybutadiene and/or a mixed polymer based on butadiene and styrene.

* * * * *